Figure 1:
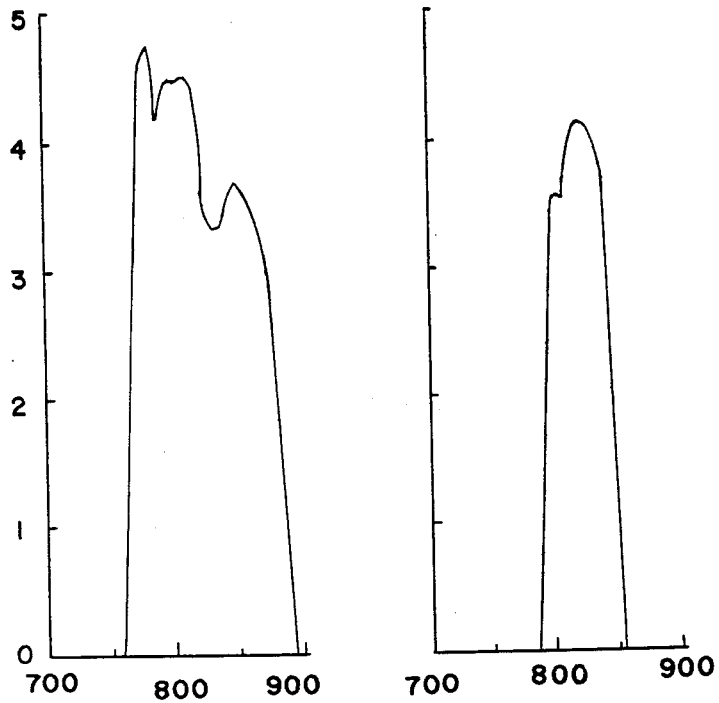

United States Patent Office 3,018,226
Patented Jan. 23, 1962

3,018,226
METHOD FOR PREPARING COKED BRIQUETS FROM CAKING COALS
James D. Batchelor, Springfield, Va., and Robert J. Friedrich, Finleyville, and Paul M. Yavorsky, Monongahela, Pa., assignors to Consolidation Coal Company, Pittsburgh, Pa., a corporation of Pennsylvania
Filed Oct. 7, 1960, Ser. No. 61,318
10 Claims. (Cl. 202—26)

The present invention relates to a method for preparing coked briquets from caking coal and porous inert ingredients. More particularly, it relates to the manner in which such briquets are heated during the coking cycle.

This application is a continuation-in-part of our copending application Serial No. 635,277, filed January 22, 1957, and since abandoned.

For many years industry has been seeking a method for preparing high strength, low density, uniform size lumps of coke from caking coals, particularly high volatile caking coals. Virtually all coke employed by industry today is prepared in expensive by-product coke ovens which require, for preparation of satisfactory coke, an extensive exposure of caking coals to high temperature conditions. High volatile caking coals are, in general, unsuitable for use as a coke oven feed material unless blended with low and/or medium volatile coals. High volatile coals include those coals having volatile matter in excess of about 30 percent.

The prior art is replete with methods and apparatus for preparing briquets and for coking the prepared briquets containing high volatile caking coal. Despite the accumulation of art, there is no substantial production of coked briquets extant. For the most part the coked briquets obtained by the methods and apparatus of the prior art are merely loosely bonded agglomerates in which individual particles of the starting materials retain their discrete identity. The individual particles are readily abraded to form coke breeze. The coked briquets moreover contain cracks and fissures which result in fracturing of the product during mechanical treatment and transportation.

We have discovered hitherto unreported properties of caking coals, particularly high volatile caking coals, which permit the preparation of satisfactory coked briquets. The term "plasticity" has long been applied to coal to define that property whereby the coal becomes fluid under thermal treatment. Prior conceptions of plasticity however have been based upon that property under the influence of uniform linear heating of the coal. We have found some surprising properties of plasticity of caking coal exhibited when the coal is subjected virtually instantaneously to elevated temperatures. For example, we have found that high volatile caking coal may be shock heated to and retained at an elevated temperature such that plasticity remains in existence for ten hours or more while the coal exhibits only a slight fluidity, corresponding to a high viscosity liquid. We have also found that high volatile caking coal may be shock heated to and retained at an elevated temperature such that the duration of plasticity is quite brief and the fluidity is quite high, i.e., the coal appears for a brief time to be a low viscosity liquid. We have applied these phenomena in the present invention.

We have been able to prepare pressed briquets from high volatile caking coal and porous inert ingredients and, by applying these phenomena, to convert the pressed briquets by shock heating into coked forms possessing a continuum of carbonaceous structure, low density and high strength, i.e., the desirable properties of metallurgical coke. We have in addition found that briquets containing high volatile caking coal, when shock heated according to this invention, must be retained at a shock heating temperature of 900 to 1250° F. for a sufficient period of time before being subjected to further thermal treatment at higher temperatures in order to prepare carbonaceous forms free of cracks and fissures which would weaken the structure of the forms.

According to our present invention we prepare under pressure a briquet containing finely divided caking bituminous coal and porous inert ingredients. The caking bituminous coal may utilize low volatile, medium volatile, or high volatile coals, alone or in suitable admixture. A high volatile caking coal is particularly preferred. The porous inert ingredients may comprise porous non-agglomerative carbonaceous solids such as low temperature carbonization char, coke breeze, petroleum coke and the like. Where the briquets are to be employed as a substitute for metallurgical coke, the porous inert ingredient preferably is the fluffy porous char produced by low temperature carbonization of high volatile caking coal under fluidized solids contacting conditions. Alternatively, or in addition to carbonaceous solids, the porous inert ingredient may comprise limestone, iron ore, phosphate ore or other metal ores. Such briquets are of value in ore reduction processes. Briquet binders such as carbonaceous pitches desirably are employed to retain the configuration of the pressed briquets prior to thermal treatment.

The formed briquet is thereupon subjected to shock heating whereby the outer surface of the briquet is virtually instantaneously raised to a temperature in the range of 900 to 1250° F. The outer surface of the briquet is maintained or held at a temperature in the range of 900 to 1250° F. until the entire briquet has passed through the plastic range and has attained a temperature in the range of 900 to 1250° F. At this point the high volatile caking coal of the briquet has lost its original character as individual discrete particles and has become a continuum of coked material, virtually free of cracks and fissures. During this holding period, the briquets are maintained without movement relative to one another. The coked briquet is ready for calcining which serves to devolatilize the material further and to graphitize the carbonaceous continuum of the briquet.

Accordingly, the briquet is heated further until the outer surface of the briquet attains a temperature in excess of 1550° F. The outer surface of the briquet is maintained at a temperature in excess of 1550° F. until the entire briquet attains a temperature in excess of 1550° F. During this calcining stage, the heating rate should not exceed about 50° F. per minute and preferably is about 20° to 35° F. per minute. The volatile matter content of the calcined briquet at this point is less than about 2 percent by weight.

Thereupon the briquet is cooled to a temperature below the atmospheric kindling temperature of the briquet as quickly as possible consistent with the avoidance of cracks and fissures resulting from thermal shrinking. The rate of cooling should not exceed about 50° F. per minute. A cooling rate of about 20° to 35° F. per minute is preferred.

The cooled calcined briquets are recovered as product. In addition, the volatile matter evolved from the briquets during the shock heating and calcining treatments is recovered as valuable liquid and vaporous products.

Figure 2:
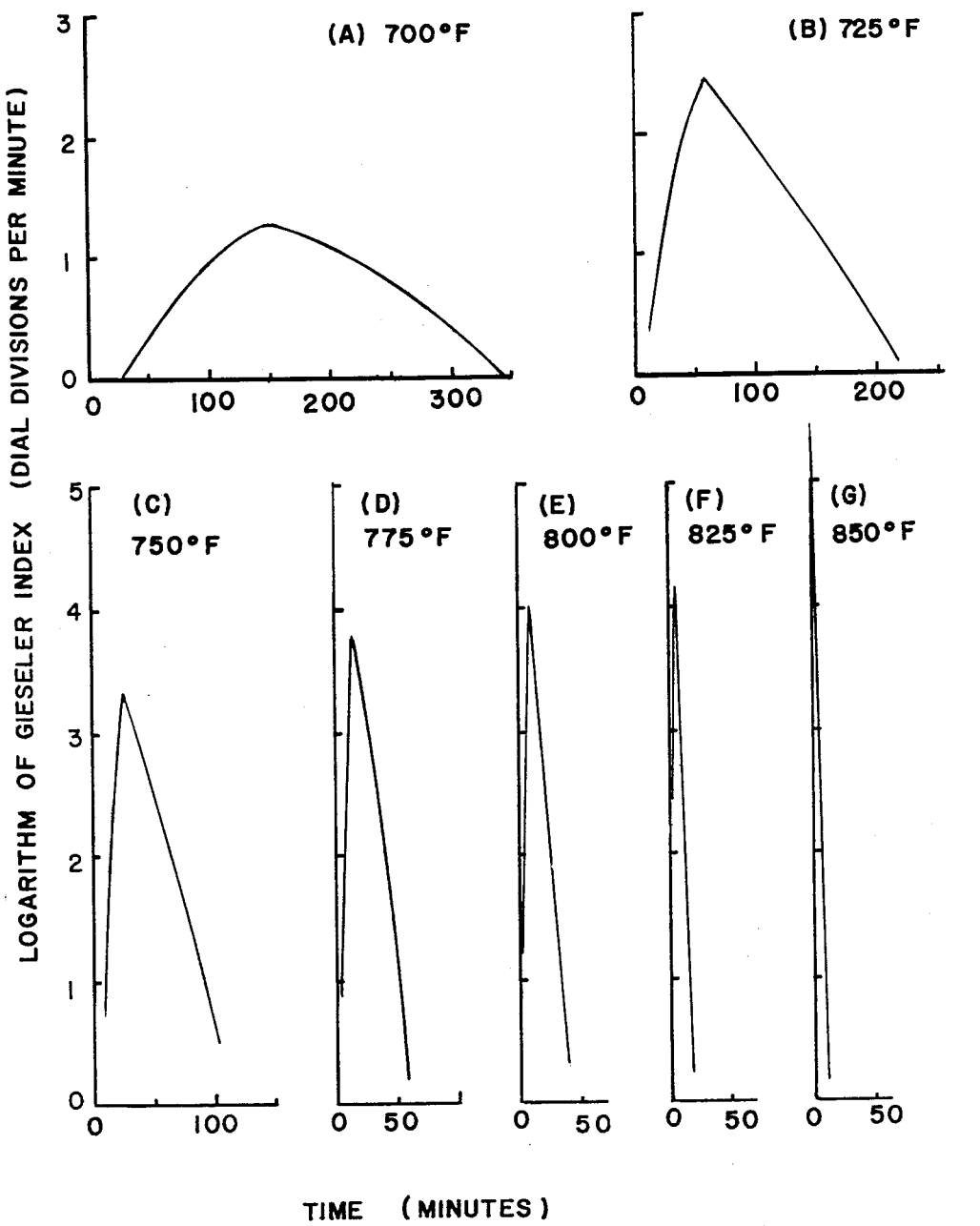
Figure 3:
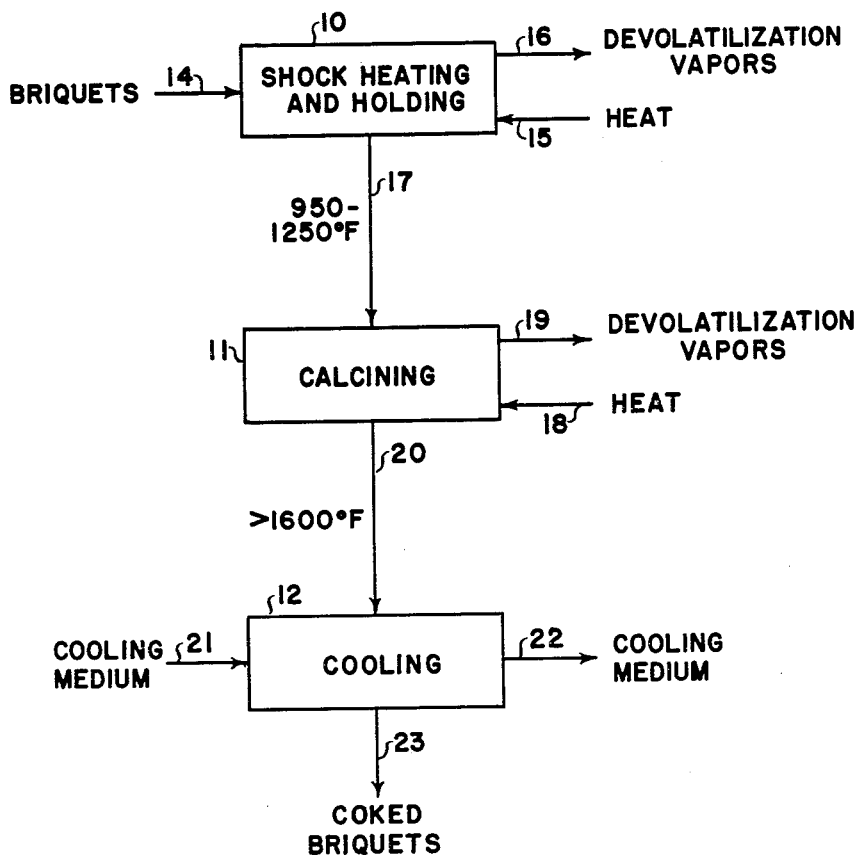
Figure 4:
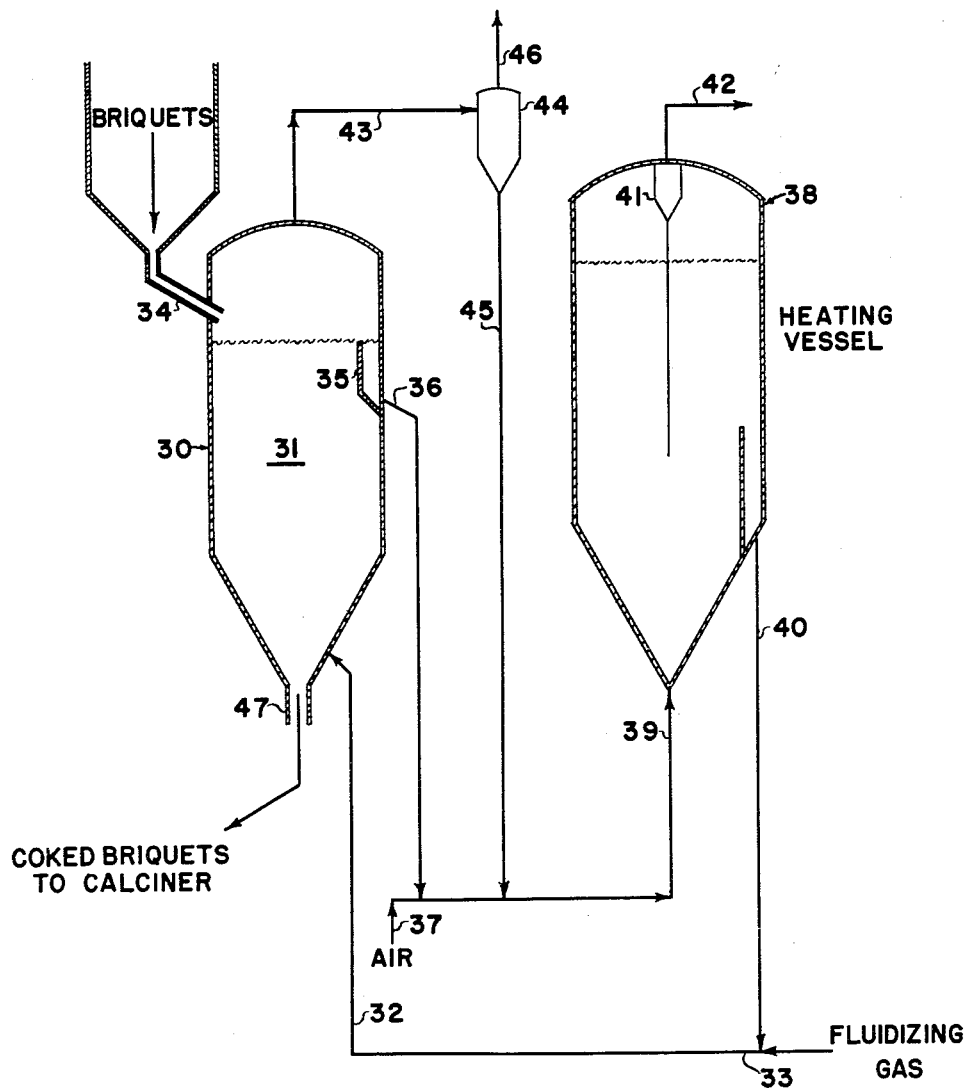

For a clear understanding of our present invention and the phenomena pertaining thereto, reference should be had to the following detailed description and accompanying drawings in which:

FIGURE 1 graphically presents Gieseler plastometer data obtained by conventional technique of constant rate temperature increase from two typical high volatile caking coals obtained from the Pittsburgh seam;

FIGURE 2 graphically presents Gieseler plastometer data obtained by a slightly modified technique involving shock heating a typical high volatile caking coal at temperatures of 700, 725, 750, 775, 800, 825, and 850° F.;

FIGURE 3 is a diagrammatic illustration in flow sheet form of the process of the present invention; and FIGURE 4 is a diagrammatic illustration of apparatus adapted to the practice of a preferred embodiment of the present invention.

A brief discussion concerning the changes which occur when caking coals are heated will provide a background for explaining our present invention. At room temperature, no plastic properties are exhibited by the coal. Initial heating of the coal up to about 212° F. results in evolution of water which exists as surface moisture and water of hydration. Continued heating above about 212° F. introduces some decomposition and ultimate softening of the coal which occurs between about 600° and 725° F. A more rapid decomposition occurs from about 725° to about 825° F. resulting in evolution of tar and gases from the coal which becomes fluid. Maximum fluidity occurs from about 715 to about 825° F. Further heating above about 900° F. results in a resolidification of the coal to a semi-coke. Continued heating to about 1500° F. and above results in a gradual shrinking of the semi-coke structure, further devolatilization and a graphitizing of the carbonaceous components.

The Gieseler plastometer is an analytical tool which has been developed for quantitative measurement of the fluidity of coals as a function of temperature. Industrial and Engineering Chemistry (Anal. Ed.), vol. 11, 242–7 (1939) Proceedings ASTM, vol. 43, 1176–93 (1943). In a standard Gieseler plastometer analysis, a sample of coal is packed tightly around a stirring shaft in a retort to prevent turning of the shaft until the coal softens. The coal sample is heated at a uniform rate of 5.4° F. per minute and the fluidity (relatable to viscosity) of the coal is measured as the velocity of rotation of the stirring shaft under constant torque. The velocity of rotation is recorded as "dial divisions per minute." The resulting readings (dial divisions per minute) can be graphically plotted versus the temperature at which the reading is obtained. A typical Gieseler plastometer graph is shown in FIGURE 1 for two typical high volatile Pittsburgh seam caking coals.

The Gieseler plastometer data of FIGURE 1(A) were obtained from Arkwright coal, a typical high volatile caking bituminous coal produced in northern West Virginia. The initial fluidity occurs at about 758° F. and quickly attains a maximum value of about 58,000 dial divisions per minute at about 780° F. The logarithm of 58,000 is 4.76. Continued heating at the Gieseler-specified rate of 5.4° F. per minute results in a sharp decrease in fluidity until substantially complete resolidification occurs at about 894° F. Thus Arkwright coal has passed entirely through its plastic range under the constant heating rate of a standard Gieseler analysis in about 25 minutes.

The Gieseler plastometer data of FIGURE 1(B) were obtained from Montour 10 coal, a typical high volatile caking bituminous coal produced in western Pennsylvania. The initial fluidity of this coal occurs at about 780° F. and quickly attains a maximum value of about 15,000 dial divisions per minute at about 815° F. The logarithm of 15,000 is 4.18. Continued heating at the Gieseler-specified rate of 5.4° F. per minute results in a sharp decrease in fluidity until substantially complete resolification occurs at about 850° F. Thus Montour 10 coal has passed entirely through its plastic range under the constant heating rate of a standard Gieseler analysis in about 13 minutes.

From FIGURE 1, it is apparent that high volatile caking bituminous coals vary somewhat in absolute fluidity, but exhibit the same generalized properties. Arkwright coal (FIGURE 1A) exhibits maximum fluidity of 58,000 dial divisions per minute in contrast to the maximum fluidity of 15,000 dial divisions per minute exhibited by Montour 10 coal (FIGURE 1B).

We have developed a modified heating program for a Gieseler determination in which the coal undergoing analysis is subjected virtually instantaneously to an elevated temperature and maintained at that constant temperature until fluidity appears and disappears. The uniform increase in temperature which is characteristic of the standard Gieseler determinations is thus eliminated in our modified technique. The Gieseler data obtained according to our modified technique are reported as dial divisions per minute against time (in minutes) since a constant temperature is maintained.

In FIGURE 2 we have illustrated seven Gieseler determinations according to our modified technique for the same Montour 10 coal whose properties are illustrated in FIGURE 1(B) according to the conventional Gieseler techniques. The seven determinations illustrated in FIGURE 2 are labeled A through G and correspond to a constant temperature heating at 700, 725, 750, 775, 800, 825 and 850° F. respectively.

Referring to FIGURE 2(A), it is seen that coal which is instantaneously exposed to a temperature of 700° F. exhibits initial fluidity after about 30 minutes exposure and retains fluidity for about 5 hours. The maximum fluidity exhibited by the coal under these conditions corresponds to 18 dial divisions per minute.

In FIGURE 2(B) a shock heating Gieseler determination for the same coal was conducted at 725° F. Under these conditions the coal maintains fluidity for nearly four hours and exhibited a maximum fluidity corresponding to about 230 dial divisions per minute.

Referring to FIGURE 2(C), the effect of shock heating the same coal at 750° F. is to shorten the period of fluidity to about 2 hours. The maximum fluidity under these conditions is about 2000 dial divisions per minute.

Referring to FIGURE 2(D), the same coal was shock heated at 775° F. Here the fluidity was maintained for a little more than an hour and attained a maximum value of about 5400 dial divisions per minute.

Referring to FIGURE 2(E), the same coal when shock heated at 800° F., exhibited fludity for less than an hour. The fluidity had a maximum value of about 9500 dial divisions per minute.

Referring to FIGURE 2(F), shock heating the same coal at 825° F. decreased the period of fluidity to about 15 minutes. The maximum fluidity was about 15,000 dial divisions per minute.

Referring to FIGURE 2(G), shock heating of the same coal at 850° F. reduced the period of fluidity to less than 10 minutes. The maximum fluidity under these conditions exceeded the range of the Gieseler plastometer and was in excess of 100,000 dial divisions per minute.

By reviewing all of the data presented in FIGURES 1 and 2, it is apparent that the duration and extent of fluidity of coal undergoing thermal treatment can be regulated by selective control of the time and temperature relationship in the heating process. By heating the coal virtually instantaneously to a temperature of 850° F. or above, the duration of the period of plasticity can be made quite brief. Yet the fluidity exhibited during this brief period is caused to increase more than sevenfold over the maximum fluidity exhibited by the same coal when exposed to constant rate temperature increase through its plastic range. To the best of our knowledge, these phenomena are hitherto unreported.

We have been able to utilize these phenomena in the present invention to provide a method for preparing coked briquets from bituminous caking coals, particularly high volatile caking coals. In a particularly preferred aspect of our invention, we prepare briquets containing high volatile caking coals and inert ingredients. For example, the coal and inert ingredients, when crushed to pass through a 14 mesh Tyler standard screen, have been found satisfactory. Briquet binders also are desirable, especially carbonaceous pitches, to provide stability of the briquets during handling prior to our briquet treatment. The briquets are virtually instantaneously exposed to conditions which cause the outer shell of the briquets to exceed a temperature of about 900° F., but less than about 1250° F., which results in a virtually instantaneous appearance and disappearance of the fluid property of the coal. The coal becomes extremely fluid to the extent that it actually engulfs and saturates the inert ingredients in the briquet. During this treatment the individual particles of coal lose their identity by fusion and engulfing of the inert ingredients.

The shock heating of the briquet surface serves to form an outer shell of coked material which is resistant to deformation. While the outer shell is virtually instantaneously passed through its brief period of plasticity, the inner components of the briquet provide the dimensional fidelity required to prevent deformation of the briquet. Thereafter, while the inner components pass through their period of plasticity, it is the coked outer shell which provides the dimensional fidelity for preventing deformation. The coked outer shell, moreover, provides a non-adherent covering for the briquet for avoiding fusion of contiguous briquets.

At the shock heating temperatures below about 900° F., deformation of the briquets will occur. At shock heating temperatures above about 1250° F., severe cracks and fissures result and fragmentation of the briquets occurs.

We have found that it is essential in processing briquets according to our invention that the heated briquets be retained at a shock heating temperature until the entire briquet has passed through the plastic range of the coal. The briquets are without relative motion to one another during this period. Since heat enters into the center of the briquet by conduction alone, a finite time is required to raise the temperature of particles at the center of the briquet through the plastic temperature range. While the center of the briquet should pass through the plastic range as quickly as possible in order to acquire the substantial increase in fluidity which we have described, nevertheless, it is important that the center of the briquet be heated sufficiently slowly to avoid the formation of cracks or fissures in the outer shell of the briquet. The coked shell of each briquet prepared according to our invention is a porous continuum which will accommodate moderate evolution of volatile material without exhibiting areas of strain resulting in fissures and cracks. We have found that if the outer shell of the briquet is virtually instantaneously heated to a shock heating temperature in the range of 900 to 1250° F. and the briquet is maintained without relative movement to other briquets at those thermal conditions until the entire briquet passes through the plastic range, deleterious cracks and fissures in the briquet do not appear. Since, as stated, the heating of the center of the briquet depends upon conduction alone, the time required for the entire briquet to pass through the plastic range will be less for small size briquets than for large size briquets.

Where the briquets have a maximum diameter less than about one inch, the "holding time" required at shock heating temperatures may be only several minutes. However, where the briquets have a maximum diameter of about two inches or more, the "holding time" at shock heating temperatures of about 30 minutes or more is necessary.

When the briquets are not retained with their outer surface at the shock heating temperature for sufficient time to allow the entire briquet to pass through the plastic range, severe fissuring and cracking appear in the briquets. Frequently the briquets will be fragmented during the succeeding calcining treatment where insufficient "holding time" is provided at the shock heating temperature. Even if fragmentation does not occur during the actual subsequent processing, the resultant briquets will be susceptible to severe shattering following their production. On the other hand, given sufficient "holding time" at shock heating temperatures, strong, shatter-resistant briquets, virtually free of cracks and fissures, can be prepared.

FIGURE 3 illustrates schematically a flow sheet describing the processing steps of the present invention. The processing steps include a shock heating and holding zone 10, a calcining zone 11, and a cooling zone 12. Formed briquets are introduced into the shock heating and holding zone 10 through a conduit 14. The briquets entering our process through the conduit 14 must be at a temperature below the plastic range of their coal component, and preferably are at a temperature below about 300° F. Heat is supplied (indicated schematically by the arrow 15) to the shock heating and holding zone 10 to provide a heat reservoir therein sufficient (1) to heat the surface of incoming briquets virtually intsantaneously to a temperature of 900–1250° F.; (2) to maintain the temperature of the heated briquet surfaces at a temperature of 900–1250° F., and (3) to heat the inner portions of the briquets to a temperature of 900–1250° F. Devolatization products of the high volatile caking coal components of the briquets are recovered from the shock heating and holding zone 10 through a conduit 16.

The heat required for the shock heating and holding zone 10 may be provided in a variety of ways, for example, by passing hot gases through the zone 10, or by passing therethrough solid inert heat carrying media such as sand, low temperature carbonization char and the like.

Sufficient residence time is provided for the briquets in the shock heating and holding zone 10 to assure that a temperature in excess of 900° F. is attained throughout. The resulting coke briquets are withdrawn from the shock heating and holding zone 10 through a conduit 17 and introduced into the calcining zone 11. Heat is supplied (schematically indicated by the arrow 18) to the calcining zone to raise the temperature of the briquet surfaces above 1550° F. and to retain the surfaces above 1550° F. until the entire briquets are heated above 1550° F. The heat required for the calcining zone 11 may be provided in a variety of ways, for example, by passing hot gases through the zone 11, or by passing therethrough solid inert heat carrying media such as sand, refractory solids and the like. Sufficient residence time is provided in the calcining zone 11 so that heating rates above 50° F. per minute are avoided. Heating rates of about 20° to 35° F. per minute are preferred. Movement of the heating gases or solid inert heat carrying media countercurrent to the movement of the briquets is preferred to provide control over the heating rates.

Devolatilization vapors from the briquets may be recovered through a conduit 19. The devolatilized, calcined briquets, having a volatile matter content of less than 2 percent, are recovered from the calcining zone 11 through a conduit 20 at a temperature above 1550° F. and transferred to the cooling zone 12. The calcined briquets are cooled in the cooling zone 12 by heat exchange with gases or solid inert heat carrying media such as sand, low temperature carbonization char and the like. A stream of coolant material is introduced into the cooling zone 12 through a conduit 21 and, after absorbing heat from the briquets, is recovered through a conduit 22. Such coolant stream, after discharge from the cooling zone 12 through conduit 22, might thereafter be introduced into the conduit 15 to provide the heat for the shock heating and holding zone 10. The briquets should be cooled to a temperature below their atmospheric kindling temperature, preferably below about 600° F. prior to discharge from the cooling zone 12 through a conduit 23 as product. Preferably the briquets are discharged onto a moving belt and are transported for a short distance at atmospheric conditions to effect further cooling.

The briquets may be introduced into the system illustrated in FIGURE 3 either continuously, semi-continuously or batchwise. Movement of the briquets through the conduits 17, 20 and 23 should be correlated with the briquet feed rate.

If the briquets are introduced into the system in a continuous manner, moving grates, screens, trays or the equivalent must be used for their transport within the shock heating and holding zone. The briquets themselves must be without relative movement to one another until completion of the shock heating and holding step. After coking, the briquets possess sufficient strength so that they may be calcined without further handling limitations. In general, to avoid unnecessary complexity of equipment, a semi-continuous type of processing is generally preferred.

A preferred heating system for the shock heating and cooling steps of the present invention is illustrated schematically in FIGURE 4. As shown in FIGURE 4, a vessel 30 is provided having vertical side walls, a top wall and conical bottom wall adapted to confine a fluidized bed of finely divided heat carrying material and a downwardly moving bed of briquets. The solids bed 31 thus comprises briquets in particle-to-particle contact having fluidized heat carrying materials in the interstices. Hot finely divided heat carrying material is introduced into the vessel 30 through a conduit 32 in suspension with a fluidizing gas introduced through a conduit 33. The heat carrying material may be sand, low temperature carbonization char or any similar inert solid material in finely divided form to permit its handling under fluidized solids contacting conditions. Briquets containing high volatile coal and inert ingredients are introduced into the vessel 30 batchwise through a conduit 34. The briquets entering the vessel 30 through conduit 34 must be below the plastic temperature of their coal component and preferably are below about 300° F. The vessel 30 is maintained at a shock heating temperature in the range of 900 to 1250° F. The heat capacity of the bed 31 should exceed to a large extent the heat capacity of the newly entering briquets so that the introduction of fresh briquets will not reduce the temperature of the bed 31 to any noticeable degree.

Finely divided heat carrying material is continuously withdrawn over an over-flow weir 35 through a conduit 36 whence it is picked up in a stream of carrying air from a conduit 37 and introduced into a heating vessel 38 through a conduit 39. The heating vessel 38 is adapted to confine a fluidized bed of finely divided heat carrying material. Air preferably is employed as a fluidizing combustion gas in the heating vessel 38. Particles of combustible material abraded from the briquets during their shock heating treatment in the vessel 30 also travel with the finely divided heat carrying material through the conduits 36 and 39 and enter the heating vessel 38. These particles of combustible material are burned with air in the heating vessel 38 to supply the heat required to raise the temperature of the finely divided heat carrying material. Heated particles of finely divided heat carrying material are recovered from the heating vessel 38 through a conduit 40 for recirculation through the conduit 32 to supply heat to the vessel 30. The gaseous products of combustion from the reaction in the heating vessel 38 are freed of entrained solid particles in a cyclone separator 41 and are discharged from the system through a conduit 42.

Where the heat carrying material entering the vessel 30 is only slightly above the temperature of the bed 31, a rapid circulation of heat carrying material will be required. Where the heat carrying material entering the vessel 30 is at a significantly higher temperature than the bed 31, a lower circulation rate for the heat carrying material should be employed.

The fluidizing gas for the shock heating treatment, introduced through the conduit 33, preferably is an inert gas such as flue gas, or recycled devolatilization gases produced in the process. The fluidizing gas which passes through the bed 31 of the vessel 30 is recovered through a conduit 43 along with the vapors and gases evolved from the briquets undergoing thermal treatment. Any particles of heat carrying material or abraded combustible material which may be entrained in the gases passing through the conduit 43 are removed from suspension in a cyclone separator 44 and may be recycled through a cyclone dipleg 45 for retention and recirculation in the system. Solids-free gases and evolved vapors are recovered from the cyclone separator 44 through a conduit 46 for recovery of the valuable liquid products of the thermal treatment of the briquets.

The residence time of briquets in the vessel 30 is regulated to assure that the desired shock heating of their surfaces occurs and also to assure that each briquet attains throughout a temperature above its plastic range, i.e., a temperature of about 900 to 1250° F. Thermally treated briquets at a temperature of 900 to 1250° F. are recovered essentially in a semi-continuous manner from the bottom of the vessel 30 through an opening 47. The coked briquets withdrawn from the vessel 30 through the opening 47 are thereupon subjected to more elevated temperature conditions until each briquet is heated throughout to a temperature above about 1550° F. When the desired devolatilization and calcining of the coked briquets has been completed, the calcined briquets may be cooled. The cooling treatment should be sufficiently slow to avoid introducing cracks and fissures from rapid thermal contraction.

EXAMPLES

To illustrate the present invention, a quantity of briquets was prepared from the following formulation:

| Ingredient | Quantity (Percent by Weight) |
| --- | --- |
| High volatile caking coal (Arkwright coal from the Pittsburgh Seam) | 25 |
| Low temperature carbonization char (prepared by fluidized low temperature carbonization process from Arkwright coal of the Pittsburgh Seam) | 58.5 |
| Coke breeze | 5.0 |
| Binder pitch | 11.5 |

The briquets were prepared in a heated press in a generally cylindrical shape having convex end surfaces. Two types of briquets were available: (a) one-inch cylindrical diameter and (b) two-inch cylindrical diameter. For each test, the briquets were shock heated in a bed of sand maintained under fluidized conditions at the desired constant temperature.

Conditions of a series of tests illustrating shock heating phenomena are presented in Table I. The results show that briquets shock heated below about 900° F. tend to deform, lose their generally cylindrical configuration and to fuse to one another. When shock heated above about 1250° F. the briquets tend to fall apart into small fragments.

*Table I.—Shock heating*

| Shock Heating Temperature, °F. | Quality of Coked Briquets |
| --- | --- |
| A. One-Inch Briquets: | |
| 1. 600 | Deformed, Fused. |
| 2. 700 | Do. |
| 3. 900 | Very slight deformation, no fusion. |
| 4. 1,100 | No deformation, no fusion. |
| 5. 1,150 | Do. |
| 6. 1,250 | Do. |
| 7. 1,450 | Severe fragmentation. |
| 8. 1,550 | Do. |
| B. Two-Inch Briquets: | |
| 9. 800 | Deformed, Fused. |
| 10. 900 | Slight deformation, no fusion. |
| 11. 950 | No deformation, no fusion. |
| 12. 1,000 | Do. |
| 13. 1,100 | Do. |
| 14. 1,200 | Do. |
| 15. 1,300 | Large cracks.[1] |
| 16. 1,500 | Severe fragmentation. |

[1] Test 15 produced a product having large cracks and fissures, although no fragmentation occurred. The product of test 15 shattered when moved.

Conditions of a series of tests illustrating the phenomena of briquet residence time at the shock heating temperature are presented in Table II. The results show that shock heating of briquets at 900 to 1250° F. alone is not sufficient to prepare satisfactory calcined briquets. Test 17 shows that a heating rate of 65° F. per minute commencing immediately after the briquet surfaces have been shock heated will cause fracturing of the one-inch briquets, although heating rates up to 32° F. per minute are satisfactory for one-inch briquets. With the two-inch briquets of test 22, immediate heating of the shock heated briquets at 1100° F. resulted in severe shattering, whereas in test 23, a residence time of 30 minutes at the shock heating temperature of 1100° F., with relative immobility of the briquets, avoided shattering from the calcining treatment.

*Table II.—Holding time at shock heating conditions*

| Shockheating Temperatures, ° F. | Holding Time at Shockheating Conditions, Min. | Heating Rate During Calcining at 1,800° F., ° F./Min. | Quality of Calcined Briquets |
|---|---|---|---|
| A. One-Inch Briquets: | | | |
| 17. 1,100 | 30 | ¹ 65 | Severely fractured. |
| 18. 1,100 | 30 | ¹ 32 | No Fractures. |
| 19. 1,100 | 30 | ¹ 20 | Do. |
| 20. 1,100 | 30 | ¹ 10 | Do. |
| 21. 1,100 | 30 | ¹ 5 | Do. |
| B. Two-Inch Briquets: | | | |
| 22. 1,100 | 0 | 2-3 | Severe shattering. |
| 23. 1,100 | 30 | 2-3 | No shattering. |

¹ Briquets retained at 1,800° F. for 30 minutes.

Conditions are presented in Table III for a series of tests illustrating calcining conditions for briquets which were shock heated and retained at the shock heating temperature for 30 minutes prior to calcining. The calcined products were compared by an abrasion test in which the abrasion index is the weight percentage of product unabraded after the materials are subjected to standardized abrasion treatment.

Tests 24 and 25 show that briquets which are retained at the calcining temperature (test 25) until heated throughout will possess greater strength than briquets which are not given calcining residence time (test 24). The nearly negligible differences resulting from variations of shock heating and calcining temperatures within the range of our invention are brought out in tests 26, 27, 28 and 29.

*Table III.—Calcining conditions*

| Shockheating Temperatures, ° F. (30 minutes holding time) | Calcining Temperature, ° F. | Heating Rate During Calcining, ° F./Min. | Residence Time of Briquet at Final Calcining Temperature, Minutes | Abrasion Index of Calcined Briquets, Percentages of Unabraded Material |
|---|---|---|---|---|
| A. One-Inch Briquets: | | | | |
| 24. 1,100 | 1,600 | 20 | 0 | Abrasion Index 83.5. |
| 25. 1,100 | 1,600 | 20 | 60 | Abrasion Index 90.9. |
| B. Two-Inch Briquets: | | | | |
| 26. 1,100 | 1,600 | 2-3 | 60 | Abrasion Index 89.8. |
| 27. 1,100 | 1,750 | 2-3 | 60 | Abrasion Index 90.5. |
| 28. 1,000 | 1,770 | 2-3 | 60 | Abrasion Index 88.8. |
| 29. 1,200 | 1,775 | 2-3 | 60 | Abrasion Index 90.2. |

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. The method for preparing calcined, coked briquets from finely divided caking bituminous coal and from porous non-agglomerative carbonaceous solids prepared by a low-temperature carbonization fluidization process which comprises forming shaped briquets from the starting materials, controllably shock heating the surface of the shaped briquets to a temperature in the range of 900 to 1250° F. and maintaining the surface of the briquets at a temperature of 900 to 1250° F. until the briquets attain throughout a temperature in the range of 900 to 1250° F., thereafter heating the surface of the briquets to a temperature above 1550° F. and maintaining the surface of the briquets at a temperature above 1550° F. until the briquets attain throughout a temperature above 1550° F. and the volatile matter content of the briquet is less than 2 percent by weight, thereafter cooling the briquets to a temperature below about 600° F. and recovering calcined, coked briquets.

2. The method for preparing calcined, coked briquets from finely divided high volatile caking coal and low temperature carbonization char which has been prepared under fluidized solids contacting conditions, which method comprises forming shaped briquets from the starting materials, controllably shock heating the surface of the shaped briquets to a temperature in the range of 900 to 1250° F. and maintaining the surface of the briquets at a temperature of 900 to 1250° F. until the briquets attain throughout a temperature in the range of 900 to 1250° F., thereafter heating the surface of the briquets to a temperature above 1550° F. and maintaining the surface of the briquets at a temperature above 1550° F. until the briquets attain throughout a temperature above 1550° F. and the volatile matter content of the briquets is less than 2 percent by weight, thereafter cooling the briquets to a temperature below about 600° F. and recovering calcined, coked briquets.

3. The method for preparing calcined, coked briquets from finely divided caking bituminous coal and from inert porous non-agglomerative carbonaceous solids prepared by a low-temperature carbonization fluidization process which comprises forming shaped briquets from the starting materials, contacting said briquets with hot inert gases at a first selected temperature to heat virtually instantaneously the surface of the shaped briquets to a temperature in the range 900 to 1250° F. and maintaining the surface of the briquets at a temperature of 900 to 1250° F. until the briquets attain throughout a temperature in the range of 900 to 1250° F., whereby substantially all of the volatile matter is evolved from the briquets as vapors, thereafter contacting said briquets with additional hot inert gases at a second selected temperature to heat the surface of the briquets to a temperature above 1550° F. and maintaining the surface of the briquets at a temperature above 1550° F. until the briquets attain throughout a temperature above 1550° F. and the volatile matter content of the briquets is less than 2 percent by weight, recovering said inert gases and evolved volatile matter, thereafter cooling the briquets to a temperature below about 600° F. and recovering calcined, coked briquets.

4. The method for preparing calcined, coked briquets from finely divided caking bituminous coal and from inert porous non-agglomerative carbonaceous solids prepared by a low-temperature carbonization fluidization process which comprises forming shaped briquets from the starting materials, introducing said briquets at a temperature below the plastic range of the coal into a shock heating zone containing finely divided solid heat carrying material under fluidized conditions at a selected elevated temperature whereby the surface of the shaped briquet is virtually instantaneously raised to a temperature in the range of 900 to 1250° F. and maintaining the said briquets with their surface at a temperature in the range of 900 to 1250° F. in said shock heating zone until the briquets attain throughout a temperature in the range of 900 to 1250° F., whereby substantially all of the volatile matter is evolved from the briquets as vapors, recovering the evolved volatile matter from said shock heating zone as a vaporous product, thereafter heating the surface of the briquets to a temperature above 1550° F. and maintaining the surface of the briquets at a temperature above 1550° F. until the briquets attain throughout a temperature above 1550° F., and the volatile matter content of the briquets is less than 2 percent by weight, thereafter cooling the briquets to a temperature below about 600° F. and recovering calcined, coked briquets.

5. The method for preparing calcined, coked briquets from finely divided high volatile caking coal and low temperature carbonization char prepared by a fluidization process which comprises forming shaped briquets from the starting materials, introducing said briquets at a temperature below the plastic range of the coal into a shock heating zone containing finely divided solid heat carrying material under fluidized conditions at a selected elevated temperature whereby the surface of the shaped briquets is virtually instantaneously raised to a temperature in the range of 900 to 1250° F. and maintaining said briquets with their surface at a temperature in the range of 900 to 1250° F. in said shock heating zone until the briquets attain throughout a temperature in the range of 900 to 1250° F., whereby substantially all of the volatile matter is evolved from the briquets as vapors, recovering the evolved volatile matter from said shock heating zone as a vaporous product, recovering from said shock heating zone a stream of finely divided solid heat carrying material and finely divided carbonaceous particles formed from said briquets by abrasion, introducing said stream into a heating zone, contacting said stream in said heating zone with air to effect combustion of said carbonaceous particles and heating of said heat carrying material, returning heated particles of said heat carrying material from said heating zone to said shock heating zone, recovering briquets at a temperature of 900 to 1250° F. from said shock heating zone and thereafter heating the surface of the briquets to a temperature above 1550° F. and maintaining the surface of the briquets at a temperature above 1550° F. until the briquets attain throughout a temperature above 1550° F. and the volatile matter content of the briquets is less than 2 percent by weight, thereafter cooling the briquets to a temperature below about 600° F. and recovernig calcined, coked briquets.

6. The method for preparing calcined, coked briquets from finely divided caking bituminous coal and from inert porous non-agglomerative carbonaceous solids prepared by a low-temperature carbonization fluidization process which comprises forming shaped briquets from the starting materials, controllably shock heating the surface of the shaped briquets to a selected temperature in the range of 900 to 1250° F. and maintaining the surface of the briquets at the selected temperature until the briquets attain throughout a temperature above 900° F., thereafter heating the surface of said briquets to a temperature above 1550° F. and maintaining the surface of said briquets at a temperature above 1550° F. until the briquets attain throughout a temperature above 1550° F. and the volatile matter content of the briquets is less than 2 percent by weight, thereafter cooling the briquets to a temperature below about 600° F. and recovering calcined, coked briquets.

7. The method of claim 6 wherein the caking coal and inert porous solids are essentially derived from high volatile caking coal.

8. The method for preparing calcined, coked briquets from finely divided high volatile caking coal and porous non-agglomerative carbonaceous solids which comprises forming shaped briquets from the starting materials, controllably shock heating the surface of the shaped briquets from a temperature below about 300° F. to a temperature in the range of 900 to 1250° F. and maintaining the surface of the briquets at a temperature of 900 to 1250° F. until the briquets attain throughout a temperature in the range of 900 to 1250° F., thereafter heating the surface of the briquets to a temperature above 1550° F. at a rate not exceeding 50° F. per minute and maintaining the surface of the briquets at a temperature above 1550° F. until the briquets attain throughout a temperature above 1550° F. and the volatile matter content of the briquets is less than 2 percent by weight, thereafter cooling the briquets at a rate not exceeding 50° F. per minute to a temperature below about 600° F. and recovering calcined, coked briquets.

9. The method of claim 8 in which the shaped briquets have a maximum diameter within the range of one to two inches.

10. The method of claim 2 in which the briquets are cooled to a temperature below about 600° F. at a rate not exceeding 50° F. per minute.

References Cited in the file of this patent
UNITED STATES PATENTS

| | | |
|---|---|---|
| 2,776,935 | Johnig et al. | Jan. 1, 1957 |
| 2,793,172 | Smith et al. | May 21, 1957 |
| 2,825,679 | Baum | Mar. 4, 1958 |